United States Patent
Ohara

(10) Patent No.: US 12,414,191 B2
(45) Date of Patent: Sep. 9, 2025

(54) TERMINAL AND COMMUNICATION METHOD

(71) Applicant: NTT DOCOMO, INC., Tokyo (JP)

(72) Inventor: Tomoya Ohara, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 409 days.

(21) Appl. No.: 17/759,798

(22) PCT Filed: Feb. 14, 2020

(86) PCT No.: PCT/JP2020/005906
§ 371 (c)(1),
(2) Date: Jul. 29, 2022

(87) PCT Pub. No.: WO2021/161537
PCT Pub. Date: Aug. 19, 2021

(65) Prior Publication Data
US 2023/0071903 A1    Mar. 9, 2023

(51) Int. Cl.
*H04W 76/28*     (2018.01)
*H04L 27/26*     (2006.01)

(52) U.S. Cl.
CPC ....... *H04W 76/28* (2018.02); *H04L 27/26025* (2021.01)

(58) Field of Classification Search
CPC ..... H04W 76/28; H04W 52/02; H04W 72/04; H04L 27/26; H04L 5/00; H04L 27/26025
See application file for complete search history.

(56) References Cited

U.S. PATENT DOCUMENTS

| | | | |
|---|---|---|---|
| 2010/0303039 A1* | 12/2010 | Zhang | H04W 74/0833 370/329 |
| 2017/0171818 A1* | 6/2017 | Agarwal | H04W 72/23 |
| 2019/0320358 A1* | 10/2019 | Knapp | H04W 24/08 |
| 2020/0112919 A1* | 4/2020 | Nam | H04L 5/001 |
| 2020/0359316 A1 | 11/2020 | Shi et al. | |
| 2021/0037592 A1* | 2/2021 | Lee | H04W 74/0833 |
| 2021/0112420 A1* | 4/2021 | Vajapeyam | H04W 16/14 |
| 2021/0127450 A1* | 4/2021 | Abdoli | H04W 72/23 |
| 2021/0185762 A1* | 6/2021 | Li | H04W 52/0216 |

(Continued)

FOREIGN PATENT DOCUMENTS

| | | |
|---|---|---|
| JP | 2020010074 A | 1/2020 |
| TW | 201935960 A | 9/2019 |
| WO | 2018088524 A1 | 5/2018 |

OTHER PUBLICATIONS

3GPP TS 38.300 V16.0.0 "3rd Generation Partnership Project; Technical Specification Group Radio Access Network; NR; NR and NG-RAN Overall Description; Stage 2 (Release 16)" Dec. 2019 (101 pages).

(Continued)

*Primary Examiner* — Hassan A Phillips
*Assistant Examiner* — Prenell P Jones
(74) *Attorney, Agent, or Firm* — Osha Bergman Watanabe & Burton LLP

(57) ABSTRACT

A terminal includes a receiving unit configured to receive a parameter related to a DRX (Discontinuous reception) from a base station, and a control unit configured to control an operation of the DRX for each of a plurality of component carriers, based on the parameter and a subcarrier spacing applied to the component carrier.

5 Claims, 9 Drawing Sheets

(56) References Cited

U.S. PATENT DOCUMENTS

| | | | | |
|---|---|---|---|---|
| 2022/0159567 A1* | 5/2022 | Yi | ........................ | H04W 72/23 |
| 2022/0190886 A1* | 6/2022 | Islam | .................... | H04B 7/0417 |
| 2022/0210765 A1* | 6/2022 | Cao | ....................... | H04L 5/0092 |
| 2022/0272650 A1* | 8/2022 | Ko | ..................... | H04W 56/0045 |
| 2023/0328648 A1* | 10/2023 | Freda | ................ | H04W 52/0232 |
| | | | | 370/311 |
| 2023/0389125 A1* | 11/2023 | Islam | ................ | H04W 52/0229 |

OTHER PUBLICATIONS

International Search Report issued in International Application No. PCT/JP2020/005906, mailed Aug. 11, 2020 (5 pages).
Written Opinion issued in International Application No. PCT/JP2020/005906; Dated Aug. 11, 2020 (3 pages).
Office Action issued in Chinese Application No. 202080096020.7, mailed Mar. 17, 2025 (15 pages).

* cited by examiner

TERMINAL AND COMMUNICATION METHOD

TECHNICAL FIELD

The present invention relates to a terminal and a communication method in a wireless communication system.

BACKGROUND ART

In the NR (New Radio) (also referred to as "5G"), which is the successor system of LTE (Long Term Evolution), techniques for satisfying, as required conditions, large capacity system, high data transmission speed, low delay, and simultaneous connection of many terminals, low cost, power saving, and the like are being studied (for example, Non-Patent Document 1). 5G is a mobile communication system that supports higher frequency band such as millimeter waves of more than 10 GHz. Ultra-high-speed wireless data communication in the class of several Gbps can be implemented by using a frequency bandwidth of several hundred MHz, which is significantly wider than conventional systems such as LTE.

In the LTE and NR, in a case where data communication of a terminal is not executed, DRX (Discontinuous reception) can be applied in order to reduce the power consumption. The DRX includes a DRX during an idle state and a CDRX during a connected state (Connected DRX).

PRIOR ART DOCUMENT

Non-Patent Document

Non-Patent Document 1: 3GPP TS 38.300 V16.0.0 (2019-12)

SUMMARY OF THE INVENTION

Problem to be Solved by the Invention

In the NR, a carrier aggregation using CCs (Component Carriers) with different subcarrier spacings (SCSs) is expected. In some of the parameters of DRX, the subcarrier spacings are not taken into consideration, and therefore, it may be impossible to appropriately control the power consumption.

The present invention has been made in view of the above problems, and it is an object of the present invention to control the electric power consumed during execution of DRX (Discontinuous reception) in a wireless communication system.

Means for Solving Problem

According to the disclosed technique, provided is a terminal including a receiving unit configured to receive a parameter related to a DRX (Discontinuous reception) from a base station, and a control unit configured to control an operation of the DRX for each of a plurality of component carriers, based on the parameter and a subcarrier spacing applied to the component carrier.

Effect of the Invention

According to the disclosed technique, the electric power consumed during execution of DRX (Discontinuous reception) in a wireless communication system can be controlled.

MODE FOR CARRYING OUT THE INVENTION

An embodiment of the present invention will be hereinafter described with reference to drawings. The embodiment described below is an example, and the embodiment to which the present invention is applied is not limited to the following embodiment.

In operation of a wireless communication system according to embodiments of the present invention, existing techniques are used as appropriate. However, an example of existing technique includes an existing LTE, but is not limited to the existing LTE. In addition, the term "LTE" used in this specification has a broad meaning including LTE-Advanced and specifications newer than LTE-Advanced (e.g., NR) unless otherwise specified.

In the embodiments of the present invention described below, terms such as SS (Synchronization signal), PSS (Primary SS), SSS (Secondary SS), PBCH (Physical broadcast channel), PRACH (Physical random access channel), PDCCH (Physical Downlink Control Channel), PDSCH (Physical Downlink Shared Channel), PUCCH (Physical Uplink Control Channel), PUSCH (Physical Uplink Shared Channel), and the like used in the existing LTE are used. This is for convenience of description, and signals, functions, and the like may be referred to as other names. In the NR, the above terms correspond to NR-SS, NR-PSS, NR-SSS, NR-PBCH, NR-PRACH, NR-PDCCH, NR-PDSCH, NR-PUCCH, NR-PUSCH, and the like. However, even when signals are used for NR, "NR-" is not necessarily attached thereto.

In the embodiments of the present invention, the duplex method may be a TDD (Time Division Duplex) system, an FDD (Frequency Division Duplex) system, or others (for example, Flexible Duplex and the like).

Further, in the embodiment of the present invention, "to configure" a radio parameter or the like may be that a predetermined value is configured in advance (pre-configured), or may be that a radio parameter notified from the base station 10 or the terminal 20 is configured.

Figure 1:
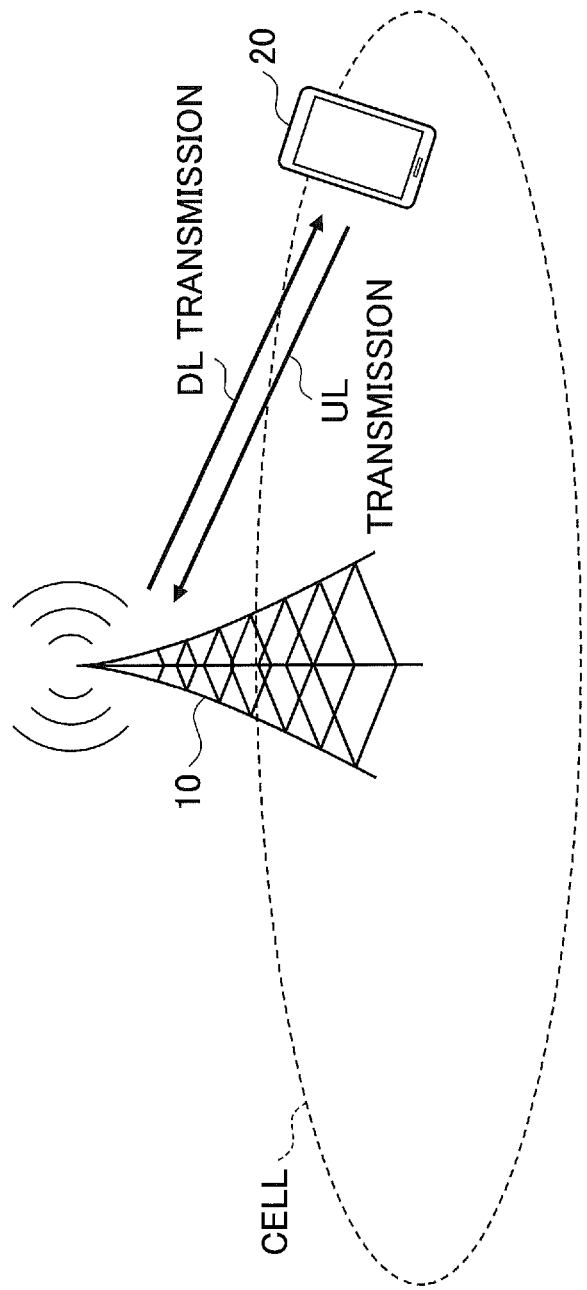
FIG. 1 is a drawing illustrating a configuration example of a wireless communication system according to an embodiment of the present invention.

FIG. 1 is a drawing illustrating a configuration example (1) of a wireless communication system according to the embodiment of the present invention. As illustrated in FIG.

1, a base station 10 and a terminal 20 are included. In FIG. 1, one base station 10 and one terminal 20 are illustrated, but this is only an example. Alternatively, a plurality of base stations 10 and terminals 20 may be provided. The terminal 20 may also be referred to as "user equipment". The wireless communication system according to the present embodiment may be referred to as a NR-U system.

The base station 10 provides one or more cells, and is a communication apparatus wirelessly communicating with the terminal 20. The physical resource of a radio signal may be defined by the time domain and the frequency domain. The time domain may be defined by slots or OFDM symbols. The frequency domain may be defined by sub-bands, subcarriers, or resource blocks.

As illustrated in FIG. 1, the base station 10 transmits control information or data to the terminal 20 through DL (Downlink), and receives control information or data from the terminal 20 through UL (Uplink). Both the base station 10 and the terminal 20 can transmit and receive signals by performing beamforming. Both of the base station 10 and the terminal 20 can apply communication based on MIMO (Multiple Input Multiple Output) to DL or UL. Also, both of the base station 10 and the terminal 20 may perform communication via a secondary cell (SCell) with CA (Carrier Aggregation) and a primary cell (PCell).

The terminal 20 is a communication apparatus equipped with a wireless communication function such as a smartphone, a mobile phone, a tablet, a wearable terminal, and a communication module for M2M (Machine-to-Machine). As illustrated in FIG. 1, the terminal 20 receives control information or data from the base station 10 in DL, and transmits control information or data to the base station 10 in UL, thereby using various communication services provided by the wireless communication system.

NR-DC (NR-Dual connectivity) may be executed. For example, a base station 10A serving as a MN (Master Node) and a base station 10B serving as a SN (Secondary Node) are provided. The base station 10A and the base station 10B are connected to a core network. The terminal 20 communicates with both of the base station 10A and the base station 10B.

A cell group provided by the base station 10A, i.e., the MN, is referred to as a MCG (Master Cell Group), and a cell group provided by the base station 10B, i.e., the SN, is referred to as a SCG (Secondary Cell Group).

Figure 2:
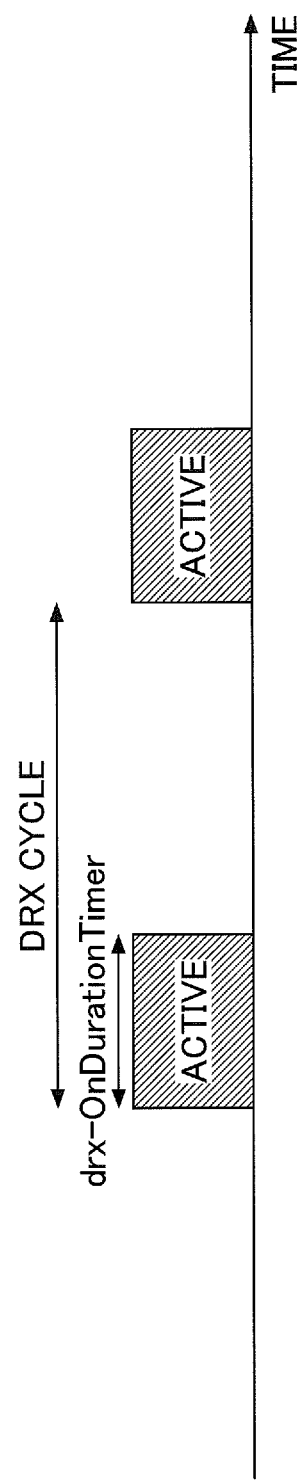
FIG. 2 is a drawing illustrating an example (1) of DRX.

FIG. 2 is a drawing illustrating an example (1) of DRX. As illustrated in FIG. 2, in a case where data communication does not occur, DRX can be applied to the terminal 20 in order to reduce the power consumption. As illustrated in FIG. 2, a duration in which the terminal 20 is in the active state is configured by drx-OnDurationTimer, and the cycle of the active duration is specified by a DRX cycle.

The parameters related to the DRX include not only the drx-OnDurationTimer but also drx-LongCycleStartOffset indicating an offset of a DRX cycle, drx-InactivityTimer indicating a period of time until the terminal 20 is brought into a sleep state by a timer started when a traffic occurs, drx-ShortCycle indicating a DRX cycle, and the like. These parameters of the DRX are configured regardless of the subcarrier spacing.

The parameters of the DRX are notified from the base station 10 to the terminal 20. For example, the parameters of the DRX may be configured in the terminal 20, for each cell group such as MCG or SCG, via information element CellGroupConfig, MAC-CellGroupConfig, and DRX-Config included in RRC messages such as RRCReconfiguration, RRCResume, or the like.

Figure 3:
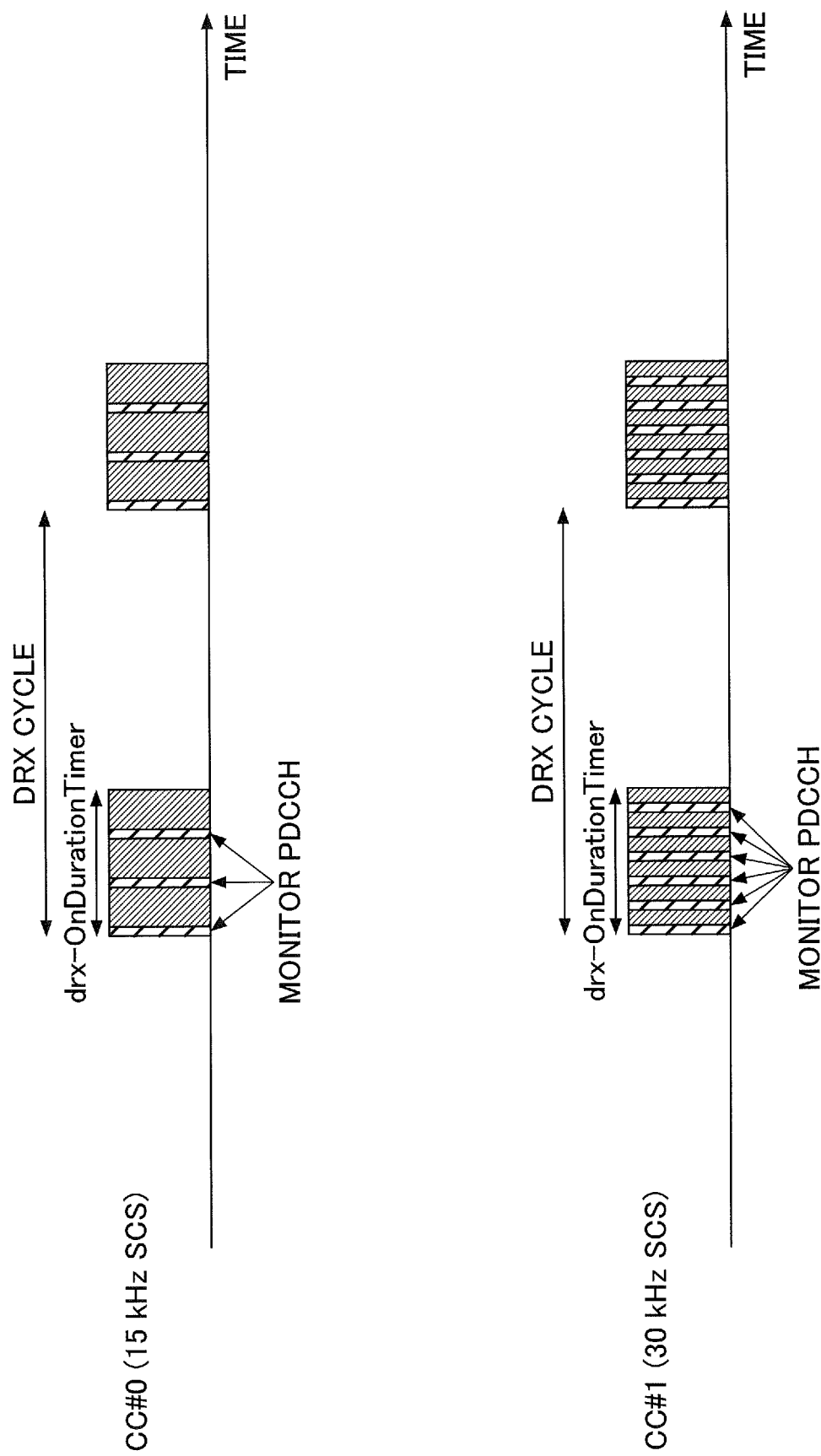
FIG. 3 is a drawing illustrating an example (2) of DRX.

FIG. 3 is a drawing illustrating an example (2) of DRX. As described above, there are parameters configured by the parameters of the DRX regardless of the subcarrier spacing, and therefore, for example, in a case where the terminal 20 uses a CC with a different subcarrier spacing during CA, the load of the processing and the like is different according to the CC, and for this reason, it may be impossible to appropriately perform control for reducing the power consumption.

For example, as illustrated in FIG. 3, in a case where the SCS applied to the CC#0 is 15 kHz, and the SCS applied to the CC#1 is 30 kHz, the same drx-OnDurationTimer value is applied to the CC#0 and the CC#1, and therefore, the frequency of monitoring the PDCCH is higher in the CC#1.

Accordingly, related parameters during DRX operation may be read or interpreted differently according to the subcarrier spacing.

Figure 4:
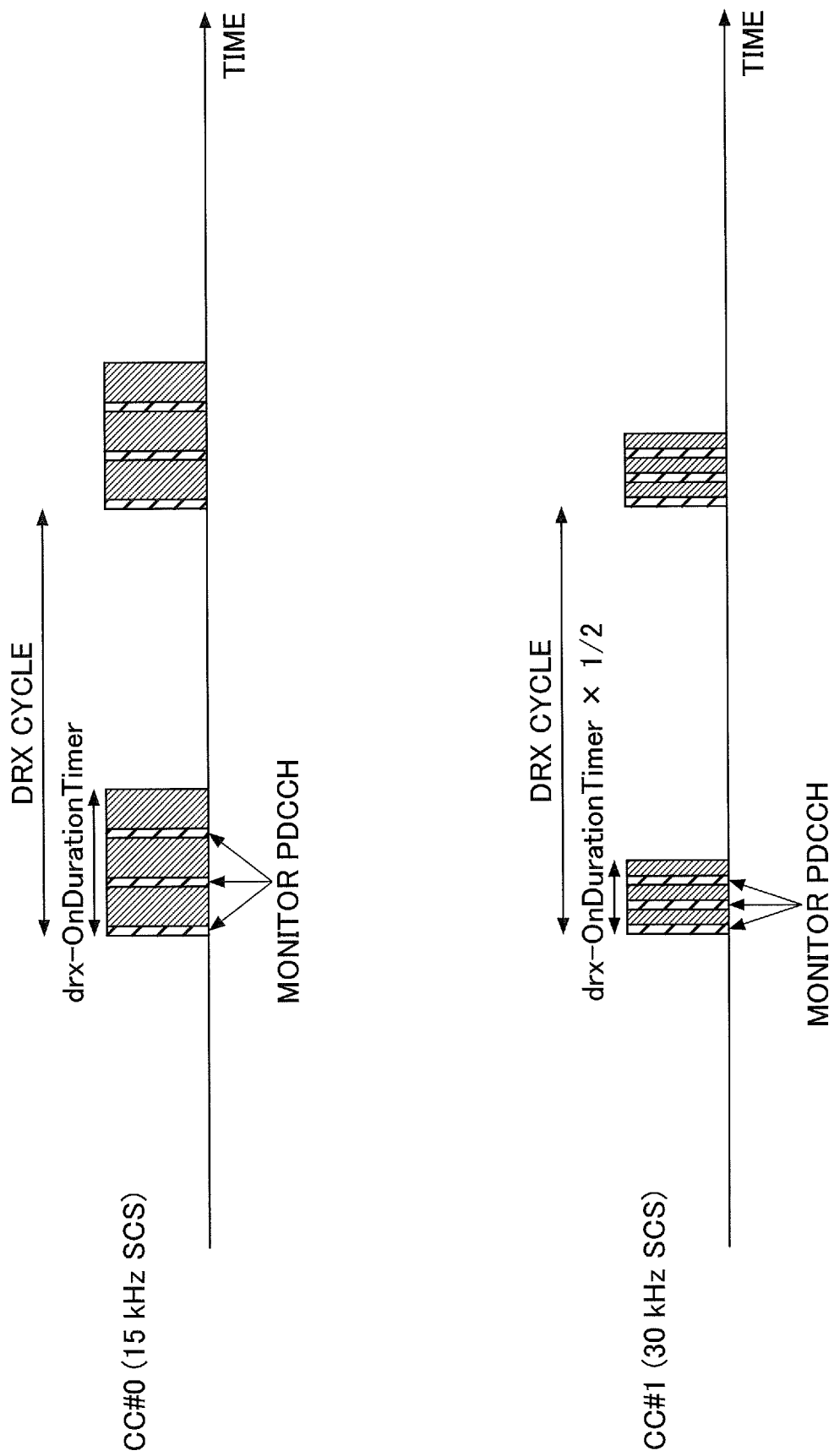
FIG. 4 is a drawing illustrating an example (1) of DRX according to the embodiment of the present invention.

FIG. 4 is a drawing illustrating an example (1) of DRX according to the embodiment of the present invention. For example, the drx-OnDurationTimer value may be changed according to the subcarrier spacing.

For example, it is assumed that the CC#0 illustrated in FIG. 4 is a PCell or a PSCell (Primary SCG Cell), and the CC#1 is an SCell. Every time the subcarrier spacing in the SCell doubles with respect to the subcarrier spacing of the PCell or PSCell, the drx-OnDurationTimer value may become half. In other words, the greater the subcarrier spacing applied to a CC is, the shorter active duration the terminal 20 may configure for the DRX. In the PCell or SCell, the configured drx-OnDurationTimer value may be used without change.

For example, in any given CC, as the subcarrier spacing of the CC doubles with respect to the subcarrier spacing determined in advance, the drx-OnDurationTimer value may be halved. For example, in the CC#1 as illustrated in FIG. 4, in a case where the subcarrier spacing determined in advance is 15 kHz, the subcarrier spacing of the CC#1 is 30 kHz, and accordingly, the drx-OnDurationTimer value may become half. In other words, the greater the subcarrier spacing applied to a CC is, the shorter active duration the terminal 20 may configure for the DRX.

The subcarrier spacing determined in advance may be 15 kHz SCS, or further may be applied to only the FR1 or may be applied to both of the FR1 and the FR2. The subcarrier spacing determined in advance may be 60 kHz SCS, or further may be applied to only the FR2. For example, in the CC of the 15 kHz SCS, the configured drx-OnDurationTimer value may be used without change.

Figure 5:
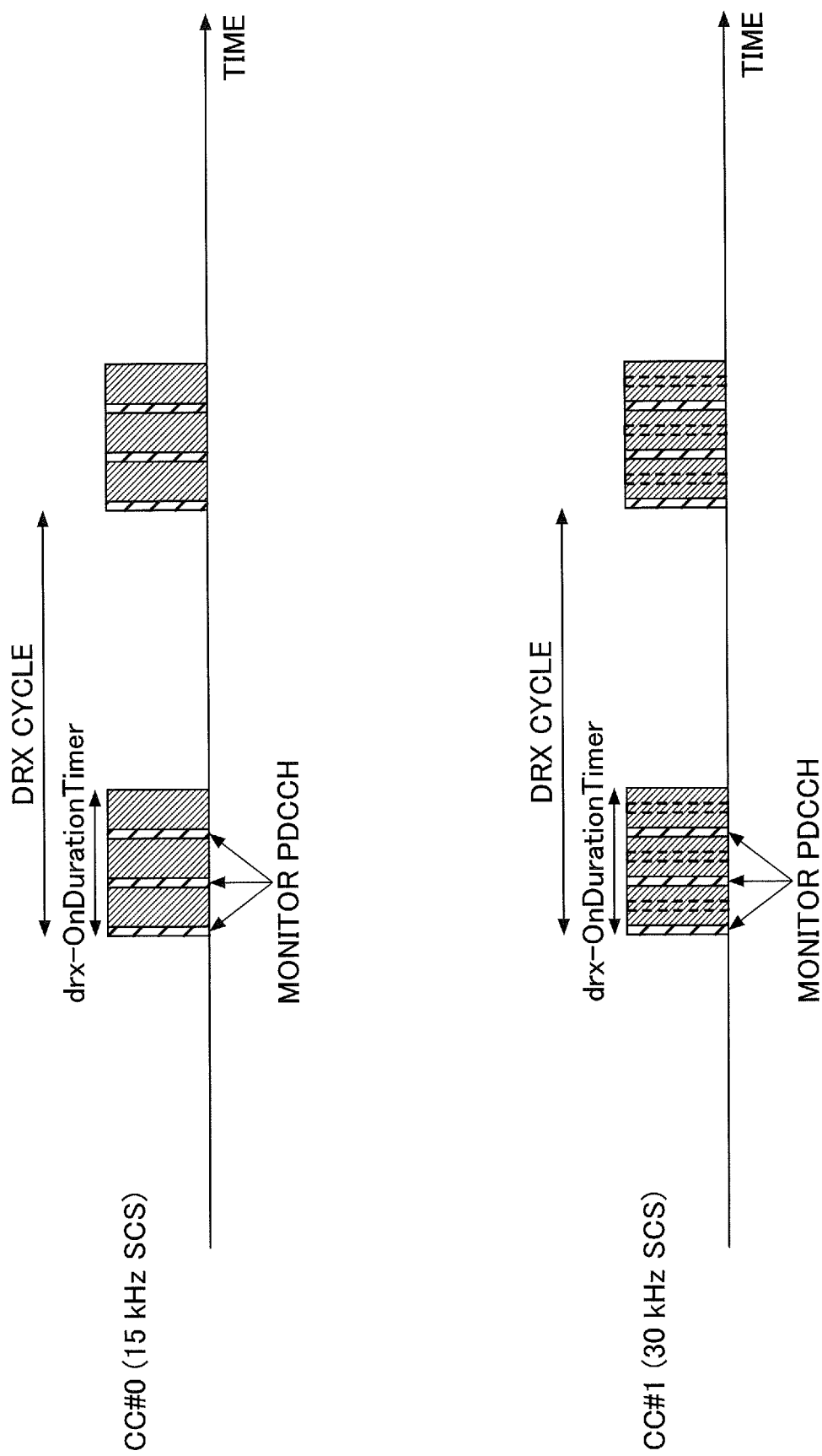
FIG. 5 is a drawing illustrating an example (2) of DRX according to the embodiment of the present invention.

FIG. 5 is a drawing illustrating an example (2) of DRX according to the embodiment of the present invention. For example, the PDCCH monitoring cycle may be changed according to the subcarrier spacing. Note that the PDCCH monitoring may be configured in units of slots.

For example, it is assumed that the CC#0 illustrated in FIG. 5 is a PCell or PSCell, and the CC#1 is an SCell. As the subcarrier spacing of the SCell doubles with respect to the subcarrier spacing of the PCell or PSCell, the terminal 20 may double the PDCCH monitoring cycle configured in advance as illustrated in FIG. 5. In other words, the greater the subcarrier spacing applied to a CC is, the longer the PDCCH monitoring cycle the terminal 20 may configure becomes, than the PDCCH monitoring cycle configured in advance for the DRX. It is not necessary to assume that the PDCCH monitoring cycle of the SCell is to be configured longer than the PDCCH monitoring cycle configured in the PCell or SCell. In the PCell or SCell, the configured PDCCH monitoring cycle may be used without change.

For example, in any given CC, as the subcarrier spacing of the CC doubles with respect to the subcarrier spacing determined in advance, the PDCCH monitoring cycle may double. For example, in the CC#1 illustrated in FIG. 5, in a case where the subcarrier spacing determined in advance is 15 kHz, the terminal 20 may double the PDCCH monitoring cycle configured in advance because the subcarrier spacing of the CC#1 is 30 kHz. In other words, the greater the subcarrier spacing applied to a CC is, the longer the PDCCH monitoring cycle the terminal 20 may configure becomes, than the PDCCH monitoring cycle configured in advance in the DRX. It is not necessary to assume that the PDCCH monitoring cycle of a CC with a subcarrier spacing different from the subcarrier spacing determined in advance is configured longer than the PDCCH monitoring cycle of a CC with the subcarrier spacing determined in advance.

The subcarrier spacing determined in advance may be 15 kHz SCS, or further may be applied only to the FR1, or may be applied to both of the FR1 and the FR2. The subcarrier spacing determined in advance may be 60 kHz SCS, or further may be applied only to FR2. For example, in the CC of the 15 kHz SCS, the configured PDCCH monitoring cycle may be used without change.

Figure 6:
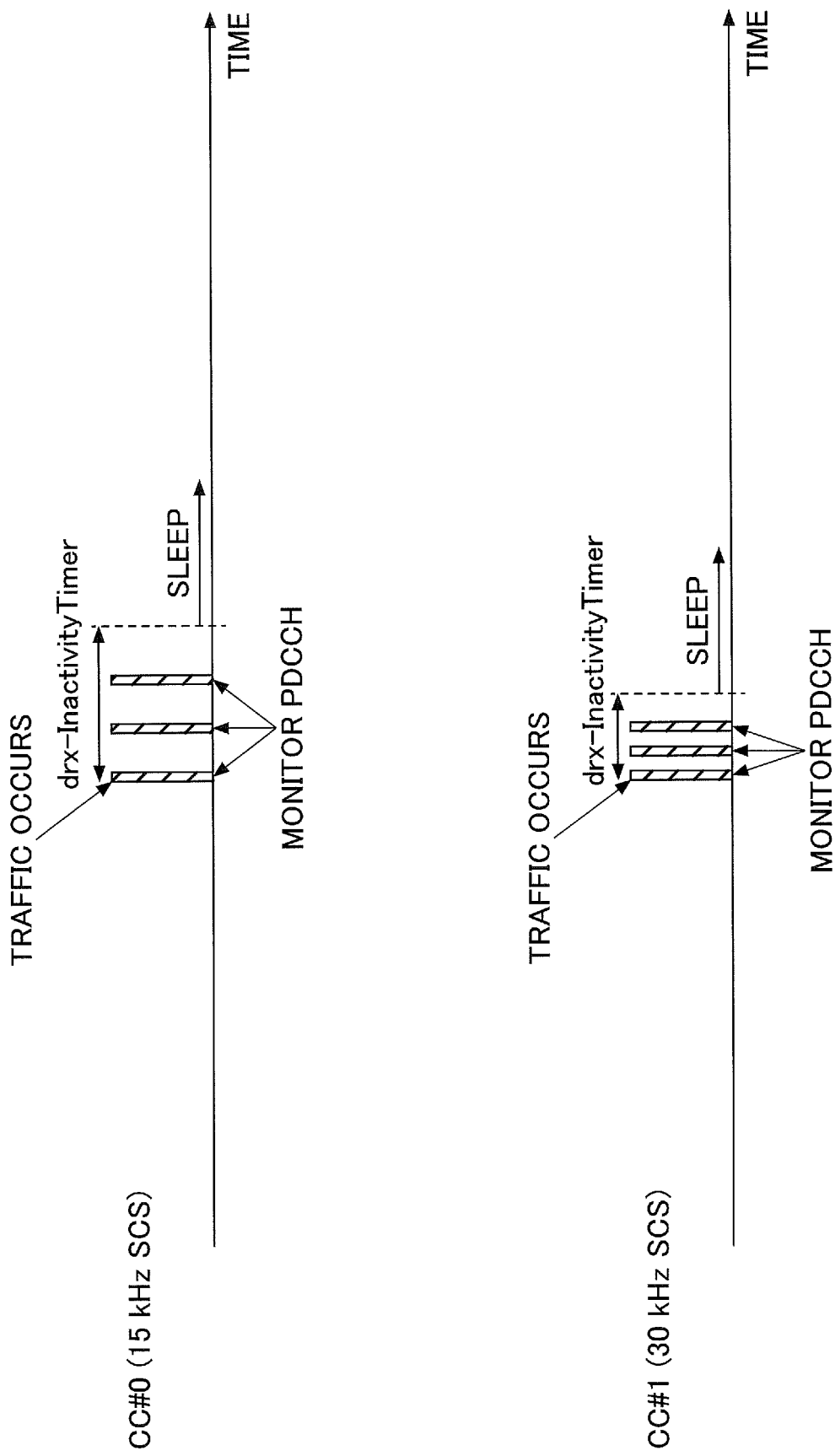
FIG. 6 is a drawing illustrating an example (3) of DRX according to the embodiment of the present invention.

FIG. 6 is a drawing illustrating an example (3) of DRX according to the embodiment of the present invention. The drx-InactivityTimer value may be changed according to the subcarrier spacing. As illustrated in FIG. 6, the timer, to which the drx-InactivityTimer value is applied, starts immediately after a PDCCH in which a traffic occurs, and when the time specified by the drx-InactivityTimer value elapses and the timer expires, the terminal 20 transitions to the sleep state.

For example, it is assumed that the CC#0 illustrated in FIG. 6 is a PCell or PSCell, and the CC#1 is an SCell. As the subcarrier spacing of the SCell doubles with respect to the subcarrier spacing of the PCell or PSCell, the drx-InactivityTimer value may become half. In other words, the greater the subcarrier spacing applied to a CC is, the shorter period of time from a traffic occurrence to a sleep state in the DRX the terminal 20 may configure. In the PCell or SCell, the configured drx-InactivityTimer value may be used without change.

For example, in any given CC, as the subcarrier spacing of the CC doubles with respect to the subcarrier spacing determined in advance, the drx-InactivityTimer value may become half. For example, in a case where the subcarrier spacing determined in advance is 15 kHz in the CC#1 as illustrated in FIG. 6, the drx-InactivityTimer value may become half because the subcarrier spacing of the CC#1 is 30 kHz. In other words, the greater the subcarrier spacing applied to a CC is, the shorter period of time from a traffic occurrence to a sleep state in the DRX the terminal 20 may configure.

The subcarrier spacing determined in advance may be 15 kHz SCS, or further may be applied to only the FR1, or may be applied to both of the FR1 and the FR2. The subcarrier spacing determined in advance may be 60 kHz SCS, or further may be applied only to the FR2. For example, in the CC of the 15 kHz SCS, the configured drx-InactivityTimer value may be used without change.

Figure 7:
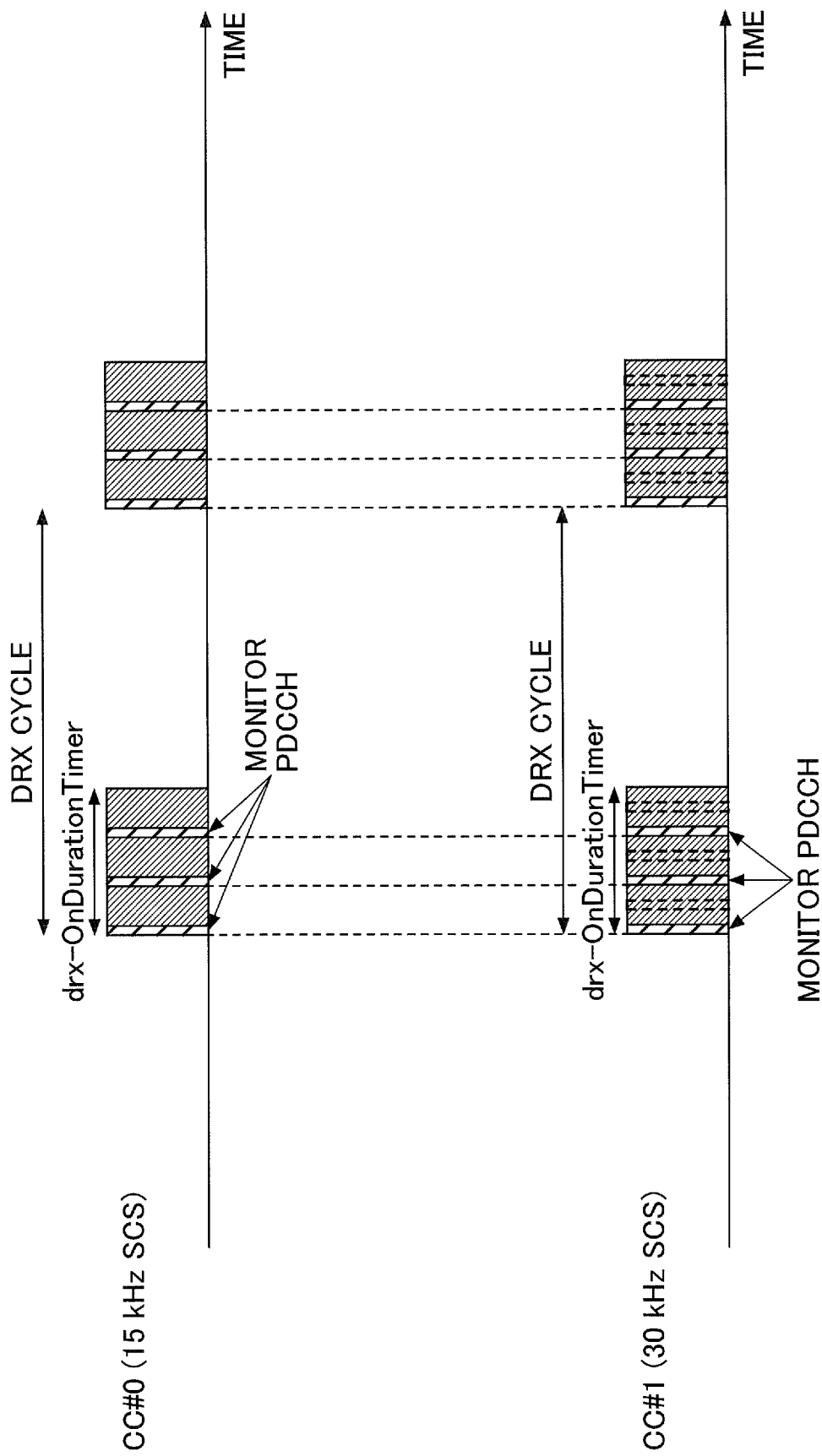
FIG. 7 is a drawing illustrating an example (4) of DRX according to the embodiment of the present invention.

FIG. 7 is a drawing illustrating an example (4) of DRX according to the embodiment of the present invention. In accordance with PDCCH monitoring in an active duration of DRX of any given CC from among multiple CCs, the terminal 20 may adjust the timing for executing the PDCCH monitoring in the active duration of the DRX of multiple CCs. For example, as shown in the following 1) to 3), the timing for executing the PDCCH monitoring may be determined.

1) In accordance with the PDCCH monitoring in an active duration of DRX of a PCell, the terminal 20 may execute PDCCH monitoring in the active duration of the DRX of multiple CCs with the same start timing as the start timing of the PCell. For example, in FIG. 7, when it is assumed that the CC#0 is a PCell and the CC#1 is an SCell, the number of PDCCH monitoring times becomes half in the CC#1 because the same timing as the timing of the PDCCH monitoring in the CC#0 is used.

2) In accordance with the PDCCH monitoring in an active duration of DRX of a CC with the smallest subcarrier spacing from among multiple CCs, the terminal 20 may execute PDCCH monitoring in the active duration of the DRX of multiple CCs at the same start timing as the start timing of the CC with the smallest subcarrier spacing from among the multiple CCs. For example, in FIG. 7, because the CC#0 is 15 kHz SCS and the CC#1 is 30 kHz SCS, the CC with the smallest subcarrier spacing is the CC#0. The PDCCH monitoring is executed in the CC#1 at the same timing as the timing of the PDCCH monitoring in the CC#0, and therefore, the number of PDCCH monitoring times in the CC#1 becomes half.

3) In accordance with the PDCCH monitoring in an active duration of DRX of a CC with the largest subcarrier spacing from among multiple CCs, the terminal 20 may execute PDCCH monitoring in the active duration of the DRX of multiple CCs at the same start timing as the start timing of the CC with the largest subcarrier spacing from among the multiple CCs.

In the above 1) to 3), the multiple CCs may be all the CCs, may be all the CCs of the FR1, or may be all the CCs of the FR2.

A different DRX configuration may be configurable for each CC. For example, different DRX configurations may be configured in the FR1 and the FR2, or a different DRX configuration may be configured for each CC which belongs to the FR1 or FR2. All of the DRX configuration may be configurable for each CC, or some of the parameters of the DRX configuration may be configurable for each CC and the remaining parameters may be common. Note that the DRX configuration may include the parameters of the DRX explained above.

In a case where the DRX configuration is not configured in any given CC, the terminal 20 may execute any one of the operations as shown in the following 1) to 4).

1) The terminal 20 applies the DRX configuration of a PCell or PSCell to the CCs.

2) In all the CCs, all the CCs in the FR1, or all the CCs in the FR2, the terminal 20 applies, to the CCs, the DRX configuration of the CC to which the smallest subcarrier spacing is applied.

3) In all the CCs, all the CCs in the FR1, or all the CCs in the FR2, the terminal 20 applies, to the CCs, the DRX configuration of the CC to which the largest subcarrier spacing is applied.

4) The terminal 20 applies, to the CCs, the DRX configuration configured with a unit wider than a CC. For example, the terminal 20 applies, to the CCs, the DRX configuration configured for each UE or for each CG (cell group).

When multiple BWPs (Bandwidth parts) with different subcarrier spacings in any given CC are configured in the terminal 20, the subcarrier spacing referred to may be determined as shown in the following 1) to 3) with respect to the subcarrier spacing of the CC applied to the operation explained with reference to the above embodiment.

1) Refer to a subcarrier spacing of a currently active BWP.
2) Refer to the smallest subcarrier spacing from among multiple BWPs.
3) Refer to the largest subcarrier spacing from among multiple BWPs.

In the above embodiment, the DRX is assumed to be a CDRX during a connected state (Connected DRX), but the embodiment may also be applied to other types of DRX such as a DRX during an idle state.

According to the above embodiment, in a case where DRX is applied to communication with multiple CCs, the terminal 20 appropriately controls, based on the subcarrier spacing, an active duration, a PDCCH monitoring cycle, or a duration from when a traffic occurs to when the terminal 20 is brought into a sleep state, so that the efficiency of utilization of the power can be improved. In a case where the DRX is applied to communication with multiple CCs, the terminal 20 performs, in accordance with the timing of PDCCH monitoring in any given CC, PDCCH monitoring in all the other CCs to cause the operation timings in the active duration to be the same as each other, so that the efficiency of utilization of the power can be improved.

In other words, the electric power consumed during execution of DRX (Discontinuous reception) in a wireless communication system can be controlled.

<Functional Configuration>

Next, an example of functional configuration of the base station 10 and the terminal 20 that execute the processing and operations described so far will be described. The base station 10 and the terminal 20 include a function for implementing the above-described embodiment. However, each of the base station 10 and the terminal 20 may have only some of the functions in the embodiment.

<Base Station 10>

Figure 8:
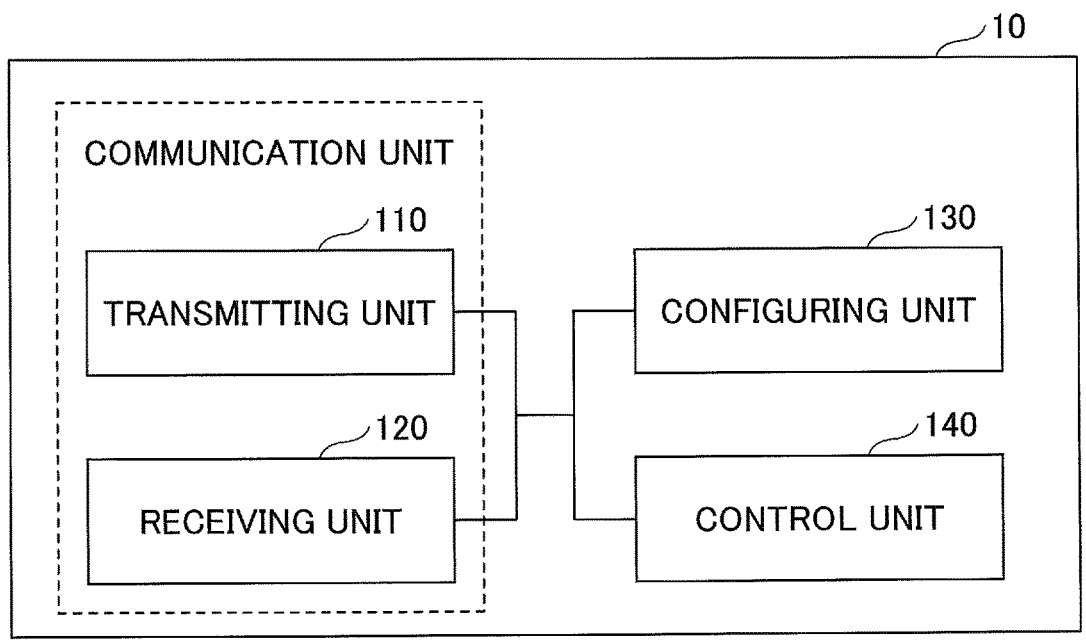
FIG. 8 is a drawing illustrating an example of a functional configuration of a base station 10 according to the embodiment of the present invention.

FIG. 8 is a drawing illustrating an example of a functional configuration of the base station 10. As illustrated in FIG. 8, the base station 10 includes a transmitting unit 110, a receiving unit 120, a configuring unit 130, and a control unit 140. The functional configuration illustrated in FIG. 8 is only an example. As long as the operation according to the embodiment of the present invention can be executed, the functions may be divided in any way, and the functional units may be given any names.

The transmitting unit 110 includes a function of generating signals to be transmitted to the terminal 20 and wirelessly transmitting the signals. Also, the transmitting unit 110 transmits an inter-network node message to another network node. The receiving unit 120 includes a function of wirelessly receiving various types of signals transmitted from the terminal 20 and acquiring, for example, information on a higher layer from the received signals. Further, the transmitting unit 110 has a function of transmitting NR-PSS, NR-SSS, NR-PBCH, a DL/UL control signal, a reference signal or the like to the terminal 20. Also, the receiving unit 120 receives an inter-network node message from another network node. The transmitting unit 110 and the receiving unit 120 may be combined into a communication unit.

The configuring unit 130 stores configuration information configured in advance and various configuration information to be transmitted to the terminal 20 in a storage device and reads out the configuration information from the storage device as needed. The contents of the configuration information include, for example, information required for DRX.

As described in the embodiment, the control unit 140 performs control of DRX. A functional unit configured to transmit signals in the control unit 140 may be included in the transmitting unit 110, and a functional unit configured to receive signals in the control unit 140 may be included in the receiving unit 120.

<Terminal 20>

Figure 9:
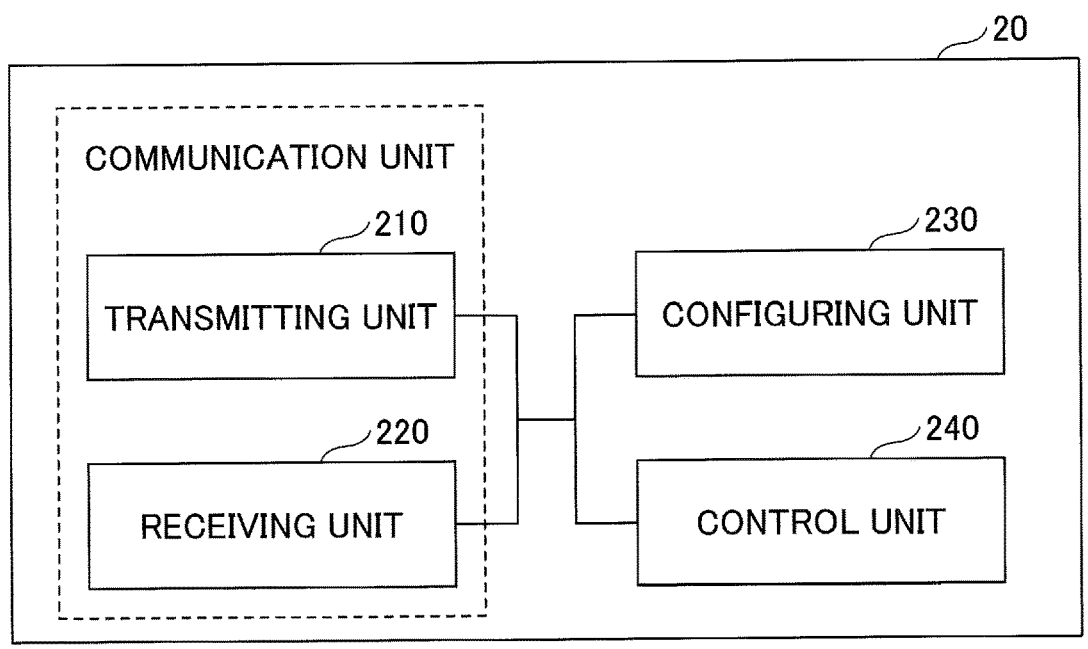
FIG. 9 is a drawing illustrating an example of a functional configuration of a terminal 20 according to the embodiment of the present invention.

FIG. 9 is a drawing illustrating an example of a functional configuration of the terminal 20 according to the embodiment of the present invention. As illustrated in FIG. 9, the terminal 20 includes a transmitting unit 210, a receiving unit 220, a configuring unit 230, and a control unit 240. The functional configuration illustrated in FIG. 9 is merely an example. As long as the operation according to the embodiment of the present invention can be executed, the functions may be divided in any way, and the function units may be given any names.

The transmitting unit 210 has a function of generating a transmission signal from transmission data and wirelessly transmitting the transmission signal. The receiving unit 220 wirelessly receives various types of signals, and acquires a signal in a higher-layer from the received signal in the physical layer. Also, the receiving unit 220 has a function of receiving NR-PSS, NR-SSS, NR-PBCH, DL/UL/SL control signals, and the like that are transmitted from the base station 10. Also, for example, in D2D communication, the transmitting unit 210 transmits, to another terminal 20, a PSCCH (Physical Sidelink Control Channel), a PSSCH (Physical Sidelink Shared Channel), a PSDCH (Physical Sidelink Discovery Channel), a PSBCH (Physical Sidelink Broadcast Channel), and the like. The receiving unit 220 receives the PSCCH, the PSSCH, the PSDCH, the PSBCH, and the like, from the another terminal 20. The transmitting unit 210 and the receiving unit 220 may be combined into a communication unit.

The configuring unit 230 stores various types of configuration information received from the base station 10 or a terminal 20 by the receiving unit 220 in a storage device and reads out the configuration information from the storage device as needed. The configuring unit 230 also stores configuration information configured in advance. The contents of the configuration information include, for example, information required for DRX.

As described in the embodiment, the control unit 240 performs control of DRX. A functional unit configured to transmit signals in the control unit 240 may be included in the transmitting unit 210, and a functional unit configured to receive signals in the control unit 240 may be included in the receiving unit 220.

<Hardware Configuration>

The block diagrams (FIGS. 8 and 9) used for explaining the above embodiments illustrate blocks in units of functions. These functional blocks (constituting units) are implemented by any combinations of at least one of hardware and software. In this regard, a method for implementing the various functional blocks is not particularly limited. That is, each functional block may be implemented by one device united physically and logically. Alternatively, each functional block may be implemented by connecting directly or indirectly (for example, in a wired or wireless manner) two or more devices that are physically or logically separated and connected together and using these multiple devices. The functional block may be implemented by combining software with the single device or multiple devices.

Functions include, but are not limited to, determining, calculating, processing, deriving, investigating, searching, confirming, receiving, transmitting, outputting, accessing, resolving, selecting, establishing, comparing, assuming, expecting, considering, broadcasting, notifying, communicating, forwarding, configuring, reconfiguring, allocating, mapping, assigning, and the like. For example, a functional block (constituting unit) that has a function of transmitting is referred to as a transmitting unit or a transmitter. As described above, a method for implementing these functions is not particularly limited.

Figure 10:
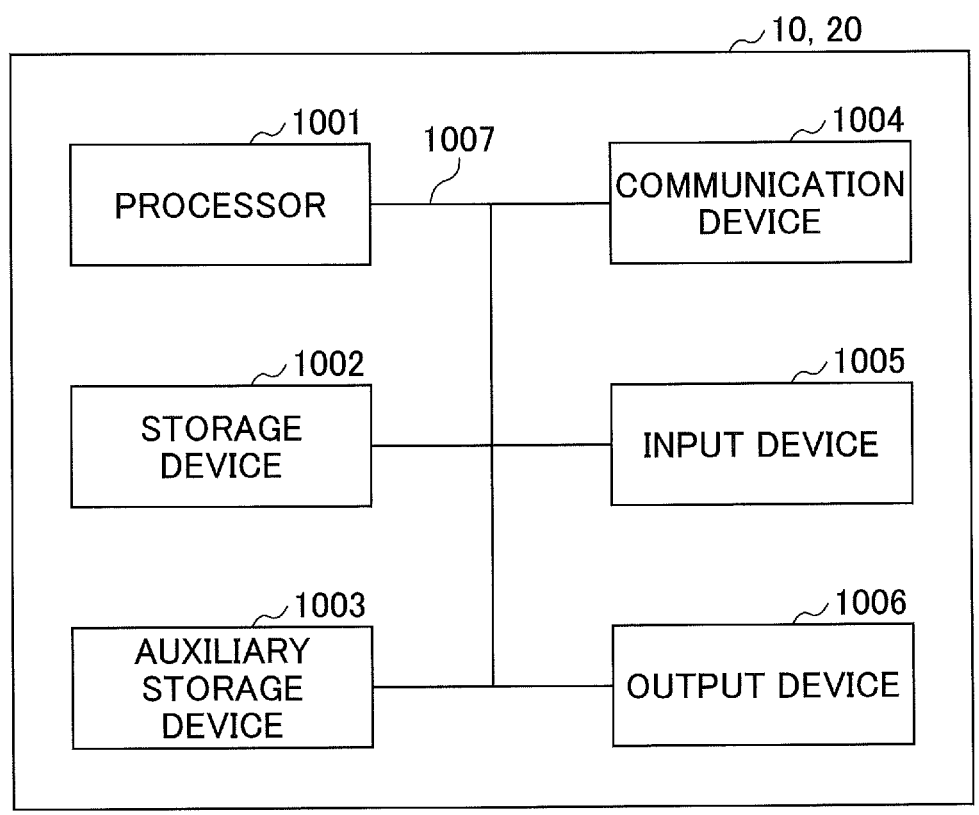
FIG. 10 is a drawing illustrating an example of a hardware configuration of the base station 10 or the terminal 20 according to the embodiment of the present invention.

For example, the base station 10, the terminal 20, and the like according to one embodiment of the present disclosure may function as a computer that performs processing of a wireless communication according to the present disclosure. FIG. 10 is a drawing illustrating an example of a hardware configuration of the base station 10 or the terminal 20 according to an embodiment of the present disclosure. Each of the base station 10 and terminal 20 may be physically configured as a computer device including a processor 1001, a storage device 1002, an auxiliary storage device 1003, a communication device 1004, an input device 1005, an output device 1006, a bus 1007, and the like.

It is noted that, in the following description, the term "device" may be read as a circuit, an apparatus, a unit, or the like. The hardware configurations of the base station 10 and the terminal 20 may be configured to include one or more of the devices illustrated in drawings, or may be configured not to include some of the devices.

Each function of the base station 10 and the terminal 20 may be implemented by reading predetermined software (program) to hardware such as the processor 1001, the storage device 1002, or the like, causing the processor 1001 to perform operations, controlling communication by the communication device 1004, and controlling at least one of reading and writing of data in the storage device 1002 and the auxiliary storage device 1003.

The processor 1001 executes, for example, an operating system to control the overall operation of the computer. The processor 1001 may be a central processing unit (CPU) including an interface with peripheral devices, a control device, an arithmetic device, a register, and the like. For example, the control unit 140, the control unit 240, and the like described above may be realized by the processor 1001.

The processor 1001 reads a program (program code), a software module, or data from at least one of the auxiliary storage device 1003 and the communication device 1004 onto the storage device 1002, and performs various processes according to the program, the software module, or the data. As the program, a program that causes a computer to perform at least some of the operations described in the embodiment explained above is used. For example, the control unit 140 of the base station 10, as illustrated in FIG. 8, may be implemented by a control program that is stored in the storage device 1002 and that is executed by the processor 1001. Also, for example, the control unit 240 of the terminal 20, as illustrated in FIG. 9, may be implemented by a control program that is stored in the storage device 1002 and that is executed by the processor 1001. Explanation has been provided above for the case in which the above various processing are performed by the single processor 1001. However, such processing may be simultaneously or sequentially performed by two or more processors 1001. The processor 1001 may be implemented with one or more chips. It is noted that the program may be transmitted from a network through an electronic communication line.

The storage device 1002 is a computer-readable recording medium and may be constituted by at least one of, for example, a ROM (Read Only Memory), an EPROM (Erasable Programmable ROM), an EEPROM (Electrically Erasable Programmable ROM), a RAM (Random Access Memory), and the like. The storage device 1002 may also be referred to as a register, a cache, a main memory (main storage device), or the like. The storage device 1002 can store a program (program code), a software module and the like that can be executed to perform a communication method according to an embodiment of the present disclosure.

The auxiliary storage device 1003 is a computer-readable recording medium and may be configured by at least one of, for example, an optical disk such as a CD-ROM (Compact Disc ROM), a hard disk drive, a flexible disk, a magneto-optical disk (for example, a compact disk, a digital versatile disk, or a Blu-ray (registered trademark) disk), a smart card, a flash memory (for example, a card, a stick, or a key drive), a floppy (registered trademark) disk, a magnetic strip, and the like. The above storage medium may be, for example, a database, a server, or other appropriate media including at least one of the storage device 1002 and the auxiliary storage device 1003.

The communication device 1004 is hardware (a transmission and reception device) for performing communication between computers through at least one of a wired and wireless networks and may also be referred to as, for example, a network device, a network controller, a network card, a communication module, or the like. The communication device 1004 may include, for example, a radio frequency switch, a duplexer, a filter, a frequency synthesizer, or the like to implement at least one of a frequency division duplex (FDD) and a time division duplex (TDD). For example, a transmission and reception antenna, an amplifier, a transmitting and receiving unit, a transmission line interface, and the like may be implemented by the communication device 1004. The transmitting and receiving unit may be implemented in such a manner that a transmitting unit and a receiving unit are physically or logically separated.

The input device 1005 is an input device (for example, a keyboard, a mouse, a microphone, a switch, a button, a sensor, or the like) that receives an input from the outside. The output device 1006 is an output device (for example, a display, a speaker, an LED lamp, or the like) that performs an output to the outside. It is noted that the input device 1005 and the output device 1006 may be integrated with each other (for example, a touch panel).

The devices, such as the processor 1001 and the storage device 1002, are connected to each other via a bus 1007 for communicating information. The bus 1007 may be constituted by using a single bus, or may be constituted by using busses different depending on devices.

The base station 10 and the terminal 20 may include hardware, such as a microprocessor, a digital signal processor (DSP), an ASIC (Application Specific Integrated Circuit), a PLD (Programmable Logic Device), or an FPGA (Field Programmable Gate Array), or alternatively, some or all of the functional blocks may be implemented by the hardware. For example, the processor 1001 may be implemented with at least one of these hardware components.

Summary of Embodiment

As described above, according to the embodiment of the present invention, provided is a terminal including a receiving unit configured to receive a parameter related to a DRX (Discontinuous reception) from a base station, and a control unit configured to control an operation of the DRX for each of a plurality of component carriers, based on the parameter and a subcarrier spacing applied to the component carrier.

According to the above configuration, in a case where DRX is applied to communication with multiple CCs, the terminal 20 appropriately controls, based on the subcarrier spacing, an active duration, a PDCCH monitoring cycle, or a duration from a traffic occurrence to a sleep state, so that the efficiency of utilization of the power can be improved. In other words, the electric power consumed during execution of DRX (Discontinuous reception) in a wireless communication system can be controlled.

The parameter may indicate an active duration, and for a component carrier to which a larger subcarrier spacing is applied, the control unit may configure a shorter active duration of the DRX. According to this configuration, in a case where DRX is applied to communication with multiple CCs, the terminal 20 appropriately controls the PDCCH monitoring cycle based on the subcarrier spacing, so that the efficiency of utilization of the power can be improved.

The parameter may indicate an active duration, and for a component carrier to which a larger subcarrier spacing is applied, the control unit may configure a longer monitoring cycle than a monitoring cycle of a control signal, the monitoring cycle being configured in advance in the active duration of the DRX. According to this configuration, in a case where DRX is applied to communication with multiple CCs, the terminal 20 appropriately controls the PDCCH monitoring cycle based on the subcarrier spacing, so that the efficiency of utilization of the power can be improved.

The parameter may indicate an active duration, and the control unit may perform, at a monitoring timing of a control signal in the active duration of the DRX of a component carrier to which a smallest subcarrier spacing is applied from among the plurality of component carriers, monitoring of a control signal in the active duration of the DRX in each of the plurality of component carriers. According to this configuration, in a case where DRX is applied to communication with multiple CCs, the terminal 20 appropriately controls the PDCCH monitoring cycle based on the subcarrier spacing, so that the efficiency of utilization of the power can be improved.

The parameter may indicate a duration from a traffic occurrence to a sleep state, and for a component carrier to which a larger subcarrier spacing is applied, the control unit may configure a shorter duration from the traffic occurrence to the sleep state. According to this configuration, in a case where DRX is applied to communication with multiple CCs, the terminal 20 appropriately controls the PDCCH monitoring cycle based on the subcarrier spacing, so that the efficiency of utilization of the power can be improved.

Also, according to the embodiment of the present invention, provided is a communication method causing a terminal to execute a receiving procedure for receiving a parameter related to a DRX (Discontinuous reception) from a base station, and a control procedure for controlling an operation of the DRX for each of a plurality of component carriers, based on the parameter and a subcarrier spacing applied to the component carrier.

According to the above configuration, in a case where DRX is applied to communication with multiple CCs, the terminal 20 appropriately controls, based on the subcarrier spacing, an active duration, a PDCCH monitoring cycle, or a duration from when a traffic occurs to when the terminal 20 is brought into a sleep state, so that the efficiency of utilization of the power can be improved. In other words, the electric power consumed during execution of DRX (Discontinuous reception) in a wireless communication system can be controlled.

Supplements to Embodiment

The embodiment of the present invention has been described above, but the disclosed invention is not limited to the above embodiment, and those skilled in the art would understand that various modified examples, revised examples, alternative examples, substitution examples, and the like can be made. In order to facilitate understanding of the present invention, specific numerical value examples are used for explanation, but the numerical values are merely examples, and any suitable values may be used unless otherwise stated. Classifications of items in the above description are not essential to the present invention, contents described in two or more items may be used in combination if necessary, and contents described in an item may be applied to contents described in another item (unless a contradiction arises). The boundaries between the functional units or the processing units in the functional block diagrams do not necessarily correspond to the boundaries of physical components. Operations of a plurality of functional units may be physically implemented by a single component and an operation of a single functional unit may be physically implemented by a plurality of components. Concerning the processing procedures described above in the embodiments, the orders of steps may be changed unless a contradiction arises. For the sake of convenience for describing the processing, the base station 10 and the terminal 20 have been described with the use of the functional block diagrams, but these apparatuses may be implemented by hardware, software, or a combination thereof. Each of software functioning with a processor of the base station 10 according to the embodiment of the present invention and software functioning with a processor of the terminal 20 according to the embodiment of the present invention may be stored in a random access memory (RAM), a flash memory, a read-only memory (ROM), an EPROM, an EEPROM, a register, a hard disk (HDD), a removable disk, a CD-ROM, a database, a server, or any suitable recording media.

Also, the notification of information is not limited to the aspect or embodiment described in the present disclosure, but may be performed by other methods. For example, the notification of information may be performed by physical layer signaling (for example, DCI (Downlink Control Information), UCI (Uplink Control Information)), higher layer signaling (for example, RRC (Radio Resource Control) signaling, MAC (Medium Access Control) signaling, broadcast information (an MIB (Master Information Block) and an SIB (System Information Block)), other signals, or combinations thereof. The RRC signaling may be also be referred to as an RRC message and may be, for example, an RRC connection setup message, an RRC connection reconfiguration message, or the like.

Each aspect and embodiment described in the present disclosure may be applied to at least one of a system that uses a suitable system such as LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (New Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), or Bluetooth (registered trademark), and a next-generation system expanded on the basis thereof. Also a plurality of systems may be combined and applied (for example, a combination of at least one of LTE and LTE-A with 5G, and the like).

In the operation procedures, sequences, flowcharts, and the like according to each aspect and embodiment described in the present disclosure, the orders of steps may be changed unless a contradiction arises. For example, in the methods described in the present disclosure, elements of various steps are illustrated by using an exemplary order and the methods are not limited to the specific orders presented.

The specific operations performed by the base station 10 described in the present disclosure may in some cases be performed by an upper node. It is clear that, in a network that includes one or more network nodes including the base station 10, various operations performed for communication with the terminal 20 can be performed by at least one of the base station 10 and another network node other than the base station 10 (for example, a MME, a S-GW, or the like may be mentioned, but not limited thereto). In the above, the description has been made for the case where another network node other than the base station 10 is a single node as an example. But the another network node may be a combination of a plurality of other network nodes (for example, a MME and a S-GW).

Information, signals, or the like described in the present disclosure may be output from a higher layer (or a lower layer) to a lower layer (or a higher layer). Information, signals, or the like described in the present disclosure may be input and output via a plurality of network nodes.

Information or the like that has been input or output may be stored at a predetermined place (for example, a memory) and may be managed with the use of a management table. Information or the like that is input or output can be overwritten, updated, or appended. Information or the like that has been output may be deleted. Information or the like that has been input may be transmitted to another apparatus.

In the present disclosure, determination may be made with the use of a value expressed by one bit (0 or 1), may be made with the use of a Boolean value (true or false), and may be made through a comparison of numerical values (for example, a comparison with a predetermined value).

Regardless of whether software is referred to as software, firmware, middleware, microcode, a hardware description language, or another name, software should be interpreted broadly to mean instructions, instruction sets, codes, code segments, program codes, a program, a sub-program, a software module, an application, a software application, a software package, a routine, a subroutine, an object, an executable file, an execution thread, a procedure, a function, and the like.

Software, instructions, information, or the like may be transmitted and received through transmission media. For example, in a case where software is transmitted from a website, a server or another remote source through at least one of wired technology (such as a coaxial cable, an optical-fiber cable, a twisted pair, or a digital subscriber line (DSL)) and radio technology (such as infrared or microwaves), at least one of the wired technology and the radio technology is included in the definition of a transmission medium.

Information, signals, and the like described in the present disclosure may be expressed with the use of any one of various different technologies. For example, data, instructions, commands, information, signals, bits, symbols, chips, and the like mentioned herein throughout the above explanation may be expressed by voltages, currents, electromagnetic waves, magnetic fields or magnetic particles, optical fields or photons, or any combinations thereof.

The terms described in the present disclosure and the terms necessary for understanding the present disclosure may be replaced with terms having the same or similar meanings. For example, at least one of a channel and a symbol may be a signal (signaling). A signal may be a message. A component carrier (CC) may be referred to as a carrier frequency, a cell, a frequency carrier, or the like.

The terms "system" and "network" used in the present disclosure are used interchangeably.

Information, parameters, and the like described in the present disclosure may be expressed by absolute values, may be expressed by relative values with respect to predetermined values, and may be expressed by corresponding different information. For example, radio resources may be indicated by indexes.

The above-described names used for the parameters are not restrictive in any respect. In addition, formulas or the like using these parameters may be different from those explicitly disclosed in the present disclosure. Various channels (for example, a PUCCH, a PDCCH, and the like) and information elements can be identified by any suitable names, and therefore, various names given to these various channels and information elements are not restrictive in any respect.

In the present disclosure, terms such as "base station (BS)", "radio base station", "base station apparatus", "fixed station", "NodeB", "eNodeB (eNB)", "gNodeB (gNB)", "access point", "transmission point", "reception point", "transmission/reception point", "cell", "sector", "cell group", "carrier", "component carrier", and the like may be used interchangeably. A base station may be referred to as a macro-cell, a small cell, a femtocell, a pico-cell, or the like.

A base station can accommodate one or a plurality of (for example, three) cells (that may be called sectors). In a case where a base station accommodates a plurality of cells, the whole coverage area of the base station can be divided into a plurality of smaller areas. For each smaller area, a base station subsystem (for example, an indoor miniature base station RRH (Remote Radio Head)) can provide a communication service. The term "cell" or "sector" denotes all or a part of the coverage area of at least one of a base station and a base station subsystem that provides communication services in the coverage.

In the present disclosure, terms such as "mobile station (MS)", "user terminal", "user equipment (UE)", and "terminal" may be used interchangeably.

By the person skilled in the art, a mobile station may be referred to as any one of a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, and other suitable terms.

At least one of a base station and a mobile station may be referred to as a transmitting apparatus, a receiving apparatus, a communication apparatus, or the like. At least one of a base station and a mobile station may be an apparatus mounted on a mobile body, or may be a mobile body itself, or the like. A mobile body may be a transporting device (e.g., a vehicle, an airplane, and the like), an unmanned mobile (e.g., a drone, an automated vehicle, and the like), or a robot (of a manned or unmanned type). It is noted that at least one of a base station and a mobile station includes an apparatus that does not necessarily move during a communication operation. For example, at least one of a base station and a mobile station may be an IoT (Internet of Thing) device such as a sensor.

In addition, a base station according to the present disclosure may be read as a user terminal. For example, each aspect or embodiment of the present disclosure may be applied to a configuration in which communication between a base station and a user terminal is replaced by communication between a plurality of terminals 20 (that may be called D2D (Device-to-Device), V2X (Vehicle-to-Everything), or the like). In this case, a terminal 20 may have above-described functions of the base station 10. In this regard, a word such as "up" or "down" may be read as a word corresponding to communication between terminals (for example, "side"). For example, an uplink channel, a downlink channel, or the like may be read as a side channel.

Similarly, a user terminal according to the present disclosure may be replaced with a base station. In this case, a base station may have above-described functions of the user terminal.

The term "determine" used herein may mean various operations. For example, judging, calculating, computing, processing, deriving, investigating, looking up, searching, inquiring (for example, looking up a table, a database, or another data structure), ascertaining, or the like may be deemed as making determination. Also, receiving (for example, receiving information), transmitting (for example, transmitting information), inputting, outputting, or accessing (for example, accessing data in a memory), or the like may be deemed as making determination. Also, resolving, selecting, choosing, establishing, comparing, or the like may be deemed as making determination. That is, doing a certain operation may be deemed as making determination. "To determine" may be read as "to assume", "to expect", "to consider", or the like.

Each of the terms "connected" and "coupled" and any variations thereof mean any connection or coupling among two or more elements directly or indirectly and can mean that one or a plurality of intermediate elements are inserted among two or more elements that are "connected" or "coupled" together. Coupling or connecting among elements may be physical one, may be logical one, and may be a combination thereof. For example, "connecting" may be read as "accessing". In a case where the terms "connected" and "coupled" and any variations thereof are used in the present disclosure, it may be considered that two elements are "connected" or "coupled" together with the use of at least one type of a medium from among one or a plurality of wires, cables, and printed conductive traces, and in addition, as some non-limiting and non-inclusive examples, it may be considered that two elements are "connected" or "coupled" together with the use of electromagnetic energy such as electromagnetic energy having a wavelength of the radio frequency range, the microwave range, or the light range (including both of the visible light range and the invisible light range).

A reference signal can be abbreviated as an RS (Reference Signal). A reference signal may be referred to as a pilot depending on an applied standard.

A term "based on" used in the present disclosure does not mean "based on only" unless otherwise specifically noted. In other words, a term "base on" means both "based on only" and "based on at least".

Any references to elements denoted by a name including terms such as "first" or "second" used in the present disclosure do not generally limit the amount or the order of these elements. These terms can be used in the present disclosure as a convenient method for distinguishing one or a plurality of elements. Therefore, references to first and second elements do not mean that only the two elements can be employed or that the first element should be, in some way, prior to the second element.

"Means" in each of the above apparatuses may be replaced with "unit", "circuit", "device", or the like.

In a case where any one of "include", "including", and variations thereof is used in the present disclosure, each of these terms is intended to be inclusive in the same way as the term "comprising". Further, the term "or" used in the present disclosure is intended to be not exclusive-or.

A radio frame may include, in terms of time domain, one or a plurality of frames. Each of one or a plurality of frames may be referred to as a subframe in terms of time domain. A subframe may include, in terms of time domain, one or a plurality of slots. A subframe may have a fixed time length (e.g., 1 ms) independent of Numerology.

Numerology may be a communication parameter that is applied to at least one of transmission and reception of a signal or a channel. Numerology may mean, for example, at least one of a subcarrier spacing (SCS), a bandwidth, a symbol length, a cyclic prefix length, a transmission time interval (TTI), the number of symbols per TTI, a radio frame configuration, a specific filtering processing performed by a transceiver in frequency domain, a specific windowing processing performed by a transceiver in time domain, and the like.

A slot may include, in terms of time domain, one or a plurality of symbols (OFDM (Orthogonal Frequency Division Multiplexing) symbols, SC-FDMA (Single Carrier Frequency Division Multiplexing) symbols) symbols, or the like). A slot may be a time unit based on Numerology.

A slot may include a plurality of minislots. Each minislot may include one or a plurality of symbols in terms of the time domain. A minislot may also be referred to as a subslot. A minislot may include fewer symbols than a slot. A PDSCH (or PUSCH) transmitted at a time unit greater than a minislot may be referred to as a PDSCH (or PUSCH) mapping type A. A PDSCH (or PUSCH) transmitted using minislots may be referred to as a PDSCH (or PUSCH) mapping type B.

Each of a radio frame, a subframe, a slot, a minislot, and a symbol means a time unit configured to transmit a signal. Each of a radio frame, a subframe, a slot, a minislot, and a symbol may be referred to as other names respectively corresponding thereto.

For example, one subframe may be referred to as a transmission time interval (TTI), a plurality of consecutive subframes may be referred to as a TTI, and one slot or one minislot may be referred to as a TTI. That is, at least one of a subframe and a TTI may be a subframe (1 ms) according to the existing LTE, may have a period shorter than 1 ms (e.g., 1 to 13 symbols), and may have a period longer than 1 ms. Instead of subframes, units expressing a TTI may be referred to as slots, minislots, or the like.

A TTI means, for example, a minimum time unit of scheduling in radio communication. For example, in an LTE system, a base station performs scheduling for each terminal 20 to assign, in TTI units, radio resources (such as frequency bandwidths, transmission power, and the like that can be used by each terminal 20). However, the definition of a TTI is not limited thereto.

A TTI may be a transmission time unit for channel-coded data packets (transport blocks), code blocks, code words, or the like, and may be a unit of processing such as scheduling, link adaptation, or the like. When a TTI is given, an actual time interval (e.g., the number of symbols) to which transport blocks, code blocks, code words, or the like are mapped may be shorter than the given TTI.

In a case where one slot or one minislot is referred to as a TTI, one or a plurality of TTIs (i.e., one or a plurality of slots or one or a plurality of minislots) may be a minimum time unit of scheduling. The number of slots (the number of minislots) included in the minimum time unit of scheduling may be controlled.

A TTI having a time length of 1 ms may referred to as an ordinary TTI (a TTI according to LTE Rel.8-12), a normal TTI, a long TTI, an ordinary subframe, a normal subframe, a long subframe, a slot, or the like. A TTI shorter than an ordinary TTI may be referred to as a shortened TTI, a short TTI, a partial or fractional TTI, a shortened subframe, a short subframe, a minislot, a subslot, a slot, or the like.

Note that a long TTI (for example, normal TTI, subframe, and the like) may be read as TTI having a time length exceeding 1 ms, and a short TTI (for example, shortened TTI) may be read as a TTI having a TTI length less than the TTI length of the long TTI and equal to or more than 1 ms.

A resource block (RB) is a resource assignment unit in terms of time domain and frequency domain and may include one or a plurality of consecutive subcarriers in terms of frequency domain. The number of subcarriers included in an RB may be the same regardless of Numerology, and, for example, may be 12. The number of subcarriers included in a RB may be determined based on Numerology.

In terms of time domain, an RB may include one or a plurality of symbols, and may have a length of 1 minislot, 1 subframe, or 1 TTI. Each of 1 TTI, 1 subframe, and the like may include one or a plurality of resource blocks.

One or a plurality of RBs may be referred to as physical resource blocks (PRBs: Physical RBs), a subcarrier group (SCG: Sub-Carrier Group), a resource element group (REG: Resource Element Group), a PRB pair, an RB pair, or the like.

A resource block may include one or a plurality of resource elements (RE: Resource Elements). For example, 1 RE may be a radio resource area of 1 subcarrier and 1 symbol.

A bandwidth part (BWP) (which may be called a partial bandwidth or the like) may mean a subset of consecutive common RBs (common resource blocks) for Numerology, in any given carrier. A common RB may be identified by a RB index with respect to a common reference point in the carrier. PRBs may be defined by a BWP and may be numbered in the BWP.

A BWP may include a BWP (UL BWP) for UL and a BWP (DL BWP) for DL. For a UE, one or a plurality of BWPs may be set in 1 carrier.

At least one of BWPs that have been set may be active, and a UE need not assume sending or receiving a predetermined signal or channel outside the active BWP. A "cell", a "carrier" or the like in the present disclosure may be read as a "BWP".

The above-described structures of radio frames, subframes, slots, minislots, symbols, and the like are merely examples. For example, the number of subframes included in a radio frame, the number of slots included in a subframe or a radio frame, the number of minislots included in a slot, the number of symbols and the number of RBs included in a slot or a minislot, the number of subcarriers included in an RB, the number of symbols included in a TTI, a symbol length, a cyclic prefix (CP) length, and the like can be variously changed.

Throughout the present disclosure, in a case where an article such as "a", "an", or "the" in English is added through a translation, the present disclosure may include a case where a noun following such article is of a plural forms.

Throughout the present disclosure, an expression that "A and B are different" may mean that "A and B are different from each other". Also this term may mean that "each of A and B is different from C". Terms such as "separate" and "coupled" may also be interpreted in a manner similar to "different".

Each aspect or embodiment described in the present disclosure may be solely used, may be used in combination with another embodiment, and may be used in a manner of being switched with another embodiment upon implementation. Notification of predetermined information (for example, notification of "being x") may be implemented not only explicitly but also implicitly (for example, by not notifying predetermined information).

In the present disclosure, the PDCCH is an example of a control signal.

Although the present disclosure has been described above, it will be understood by those skilled in the art that the present disclosure is not limited to the embodiment described in the present disclosure. Modifications and changes of the present disclosure may be possible without departing from the subject matter and the scope of the present disclosure defined by claims. Therefore, the descriptions of the present disclosure are for illustrative purposes only, and are not intended to be limiting the present disclosure in any way.

REFERENCE SIGNS LIST 10 base station
110 transmitting unit
120 receiving unit
130 configuring unit
140 control unit
20 terminal
210 transmitting unit
220 receiving unit
230 configuring unit
240 control unit
1001 processor
1002 storage device
1003 auxiliary storage device
1004 communication apparatus
1005 input device
1006 output device

The invention claimed is:

1. A terminal comprising:
a receiver configured to receive a parameter related to a DRX (Discontinuous reception) from a base station; and
a processor configured to control an operation of the DRX for each of a plurality of component carriers, based on the parameter and a subcarrier spacing applied to the component carrier,
wherein the receiver is further configured to receive a Physical Sidelink Shared Channel (PSSCH), and
wherein the parameter indicates an active duration, and the processor performs, at a monitoring timing of a control signal in the active duration of the DRX of a component carrier to which a smallest subcarrier spacing is applied from among the plurality of component carriers, monitoring of a control signal in the active duration of the DRX in each of the plurality of component carriers.

2. The terminal according to claim 1, wherein the parameter indicates the active duration, and for a component carrier to which a larger subcarrier spacing is applied, the processor configures a shorter active duration of the DRX.

3. The terminal according to claim 1, wherein the parameter indicates the active duration, and for a component carrier to which a larger subcarrier spacing is applied, the processor configures a longer monitoring cycle than a monitoring cycle of a control signal, the monitoring cycle being configured in advance in the active duration of the DRX.

4. The terminal according to claim 1, wherein the parameter indicates a duration from a traffic occurrence to a sleep state, and for a component carrier to which a larger subcarrier spacing is applied, the processor configures a shorter duration from the traffic occurrence to the sleep state.

5. A communication method causing a terminal to execute:

a receiving procedure for receiving a parameter related to a DRX (Discontinuous reception) from a base station; and a control procedure for controlling an operation of the DRX for each of a plurality of component carriers, based on the parameter and a subcarrier spacing applied to the component carrier, wherein the terminal further receives a Physical Sidelink Shared Channel (PSSCH), and wherein the parameter indicates an active duration, and the terminal performs, at a monitoring timing of a control signal in the active duration of the DRX of a component carrier to which a smallest subcarrier spacing is applied from among the plurality of component carriers, monitoring of a control signal in the active duration of the DRX in each of the plurality of component carriers.

* * * * *